United States Patent [19]  
Friedman

[11] 4,427,069  
[45] Jan. 24, 1984

[54] SAND CONSOLIDATION METHODS
[75] Inventor: Robert H. Friedman, Houston, Tex.
[73] Assignee: Getty Oil Company, Houston, Tex.
[21] Appl. No.: 271,426
[22] Filed: Jun. 8, 1981
[51] Int. Cl.$^3$ .......................................... E21B 33/138
[52] U.S. Cl. .................................... 166/295; 166/300
[58] Field of Search ............... 166/270, 288, 276, 295, 166/300

[56] References Cited

U.S. PATENT DOCUMENTS

| | | | |
|---|---|---|---|
| 2,604,172 | 7/1952 | Wrightsman | 166/295 X |
| 3,199,588 | 8/1965 | Holbert | 166/295 |
| 3,199,590 | 8/1965 | Young | 166/295 |
| 3,209,826 | 10/1965 | Young | 166/295 X |
| 3,373,812 | 3/1968 | Smith | 166/288 |
| 3,373,813 | 3/1968 | Jennings et al. | 166/25 |
| 3,412,796 | 11/1968 | Dekking | 166/300 X |
| 3,544,530 | 12/1970 | Shaffer | 260/785 |
| 3,548,944 | 12/1970 | Hess | 166/295 |
| 3,554,287 | 1/1971 | Eilers | 166/295 |
| 3,612,181 | 10/1971 | Brooks, Jr. | 166/300 X |
| 3,630,285 | 12/1971 | Claytor, Jr. et al. | 166/300 |
| 3,866,685 | 2/1975 | Friedman | 166/300 X |

FOREIGN PATENT DOCUMENTS

| | | |
|---|---|---|
| 1172116 | 11/1969 | United Kingdom . |
| 1247856 | 9/1971 | United Kingdom . |
| 1345774 | 2/1974 | United Kingdom . |
| 1422672 | 1/1976 | United Kingdom . |
| 1511589 | 5/1978 | United Kingdom . |

OTHER PUBLICATIONS

Young, et al., "Here's A New Sand-Pack Method", *The Oil and Gas Journal*, vol. 67, No. 10, Mar. 10, 1969, pp. 64–67.

Modern Plastics Encyclopedia, p. 124 (1970–1971).

*Primary Examiner*—Stephen J. Novosad  
*Assistant Examiner*—George A. Suchfield  
*Attorney, Agent, or Firm*—Arnold, White & Durkee

[57] ABSTRACT

Methods are provided for selectively consolidating sand grains within a subterranean formation. First an acidic salt catalyst such as $ZnCl_2$ is injected into the subterranean formation, wherein the acidic salt catalyst is adsorbed to the surface of the sand grains. Next a polymerizable resin composition such as furfuryl alcohol oligomer is introduced into the well formation. Polymerization of the resin occurs upon exposure to the elevated well temperatures and contact with the acid salt catalyst adsorbed to the sand grains. The polymerized resin serves to consolidate the surfaces of the sand grains while retaining permeability through the pore spaces. An ester of a weak organic acid is included with the resin compositions to control the extent of a polymerization by consuming the water by-product formed during the polymerization reaction.

15 Claims, No Drawings

SAND CONSOLIDATION METHODS

BACKGROUND OF THE INVENTION

This invention relates to methods of sand consolidation in subterranean formations. More particularly, the invention relates to improved methods for selectively consolidating the surface of sand grains in-situ using site specific catalysts.

Sand consolidation is a near wellbore treatment of a producing well. Surrounding a wellbore in many instances are highly porous and fragmentable sand formations. Under production conditions, the sand is often displaced from its aggregated structure and carried along by a fluid flood operations to a producing well. If the sand flow is allowed to proceed unchecked the producing wellbore soon becomes full of sand, thereby clogging oil production. Furthermore, sand arriving at the surface of the well wears out the production hardware.

It has therefore been the subject of extensive research by the petroleum industry to develop techniques to minimize or obviate displacement of sand particles into producing well areas. One such general approach suggested in the art is to consolidate the porous sand structures. Sand consolidation techniques are aimed at cementing loose sand structure adjacent a wellbore. Such consolidation is necessary to prevent breakdown of sand formations and subsequent clogging of producing wells.

The major feature of sand consolidation is to make a sieve next to the producing wellbore such that oil can reach the wellbore while sand flow is retarded. The sieve is composed of sand formations already present surrounding the wellbore area cemented together by consolidating material added to the formations. The consolidation need only be thick enough to prevent sand breakdown adjacent to the wellbore. Ordinarily sand consolidation is effected for six to eight inches around the periphery of the wellbore.

Accordingly, the criteria for good sand consolidation are as follows. First, the consolidation structure should hold back sand particles while preserving high permeability. As consolidating material is added to sand formation, this material will necessarily occupy part of the pore space causing permeability reduction. Therefore, an object of practical sand consolidation is to minimize occlusion of pore spaces so that oil can flow to producing wellbore.

Second, durability is a desired feature of sand consolidation. The thin film of consolidating material holding the sand grains should be physically durable in resisting deterioration by oil, water, and other fluids in the formation. In particular, the consolidated structure should be resistant to high temperature degradation induced by steam displacement operations.

Third, the consolidation action should not set up in the wellbore prematurely thereby occluding the wellbore path for oil production.

Further, the consolidation operation should be simple, efficient, and inexpensive. The economic significance of such an operation is great and the problems described above have been well recognized by the petroleum industry for many years. Many efforts have been made to satisfy these problems in whole or in part.

One particular approach to sand consolidation has been to inject into a well a polymerizable resin which polymerizes within the well formation upon exposure to the elevated well temperature. The polymer material forms a viscous mass which readily adheres to the porous sand structures. As the sand surfaces become coated, they no longer are subject to displacement when exposed to fluid flow. Unfortunately, the polymerization reaction is difficult to control so as to only consolidate the sand grains without plugging the pore spaces and ultimately blocking permeability through the porous strata.

One of the better sand consolidating agents for high temperature wells is a polymerized furfuryl alcohol resin. The material resists heat as well as oil and water. The problem in using this material is in catalyzing the polymerization. If delayed action catalyst is carried in a mixture containing the furfuryl alcohol oligomer, polymerization may occur too early causing wellbore blockage or too extensively so that permeability is lost; or alternatively, polymerization may not occur at all or be inadequate to effect consolidation.

The technique described by the present invention represents an improvement over the methods used previously, in that polymerization and consequently consolidation of the sand positively occurs and occurs only adjacent to the sand grains, thus preserving most of the original permeability. The polymerization reactions disclosed are effected by an acidic material and happen only where the acidic material is present. By injecting a solution of an acidic salt catalyst, the salt selected as one which is adsorbed by sand or rock, the catalyst is present exactly where needed.

SUMMARY OF THE INVENTION

This invention relates to improved sand consolidation methods. The methods involve, first, the injection of an acidic salt catalyst into a subterranean well formation. The acidic salt catalyst is physically adsorbed onto sand grains located within the well formation. The acidic salt catalyst forms a dispersed layer on the surface of the sand grains. Next a polymerizable resin composition is injected into the well formation. As the polymerizable resin contacts the adsorbed acidic catalyst, the combined influences of the elevated well temperatures and catalyst cause the resin to form a polymer which coats or consolidates the surface of the sand grains. That resin which does not contact the acidic salt catalyst does not polymerize. Permeability of the well formation is maintained because consolidation only occurs adjacent to the sand particles at the site of the dispersed acid catalyst, and polymerization does not occur in the pore spaces where there is no catalyst present.

An ester of weak organic acid is also injected into the well formation to assure that polymerization goes forward. As the polymerization reaction proceeds, water is produced as a by-product. The included ester serves to consume the water in a hydrolysis reaction.

Consolidation occurs on or very near the sand grains, serving to coat the sand particles with a resin polymer while leaving the permeability of the pore spaces substantially unattended.

The thickness of the consolidated sand layer may be regulated by the cotemporaneous injection into the well formation of a second adsorbent salt in addition to the selected acidic salt catalyst. The second salt, which also adsorbs to the sand grain surfaces, serves to limit the availability of adsorption sites presented to a given concentration of acidic salt catalyst. The reactions specified in the disclosed embodiments are effective in forming economical selective consolidating agents which are long lasting and resistant to the relatively high temperatures of the well formation.

DETAILED DESCRIPTION OF PREFERRED EMBODIMENTS

The invention relates to improved sand consolidation methods, which are effective and durable at elevated temperatures and to production fluid flow, the consolidation lasting a relatively long time span and effective at a relatively high temperature.

The methods provided comprise sequential treatment of well formations with compositions comprising acidic salt catalysts followed with compositions comprising polymerizable resins. In each instance the resins react in the formation when in contact with the acidic catalyst to produce a polymerized resin which is effective to consolidate sand formations. Further, the methods of this invention provide that the resins polymerize adjacent to the site of the sand grain thereby consolidating only the sands while substantially preserving the permeability of the well formation.

The invention will be described in terms of the preferred embodiments, which represent the best mode of the invention known to the inventor at the time of this application.

In accordance with a first embodiment of the invention, an acidic salt catalyst is provided. An acidic salt is a salt compound of strong acid and a weak base which dissolved in water is acid to litmus. Examples of acidic salt catalysts which are desirably useful in practicing the present invention include but are not limited to $AlCl_3$, $ZnCl_2$, $CrCl_3$, and $ZrCl_4$. An additional factor in the selection of an acidic salt for use in the present invention is the requirement that the salt adsorb to sand particles. For this purpose it is preferred that the salt have a high charge density on the cation, i.e., high charge relative to size. A divalent or trivalent cation therefore is preferred to a monovalent cation. Such cations will adsorb more tenaciously on the negatively charged rock or sand.

The selection of acid salt catalyst also depends on the surrounding temperature of the wellbore. Generally a stronger acidic salt is used in conjunction with a cooler temperature wellhole. For example in the steam zone adjacent to a wellbore, the temperature range frequently encountered is from 300° to 350° F. At this temperature range it is preferable to use $ZnCl_2$. However, at lower temperatures such as around 200° F., a stronger acid salt such as $CrCl_3$ is preferred to facilitate the polymerization reaction. With very hot reservoirs as high as 500° F., it is desirable to use a salt having a higher charge density cation such as $CrCl_3$. At these high temperatures the lower charge density cation will boil off from the sand.

A solution of the acid salt catalyst, preferably $ZnCl_2$, is injected into a wellbore containing sand formations at elevated temperatures. The salt solution introduced to the wellbore is desirably a saturated solution. This is to conserve fluid volume and to enhance adsorption. Adsorption or plating from solution increases with ion concentration. There is no particular relationship between volume of salt solution introduced to reservoir volume. The intent of this consolidation process is to consolidate from six to eight inches of sand surrounding the wellbore. Typically, the volume of salt solution introduced to the wellbore is approximately three times the volume necessary to fill the six inch volume surrounding the injection wellbore. Once within the well formation, the salt is strongly adsorbed by the sand grains thereby creating a dispersed coating of acidic catalyst on the surface of the sands.

Further in accordance with the preferred embodiment of the present invention, a resin is introduced to the wellbore following the introduction of the acidic salt solution. There are certain readily available and inexpensive polymerizable resins, which polymerize upon exposure to heat and contact with an acid catalyst. For example, furfuryl alcohol oligomer, $(C_4H_3OCH_2O)_xH$, is a relatively inexpensive polymerizable resin which auto-polymerizes upon exposure to acid catalysts forming a thermosetting resin which cures to an insoluble mass highly resistant to chemical attack and thermal degradation. Specifically, it is recommended that the resin used be Quacorr 1300, marketed by Quaker Oats. This particular resin is favored because it is oil soluble.

The furfuryl alcohol oligomer may be desirably diluted with an appropriate solvent such as ethyl acetate to decrease viscosity of the fluid such that it can be manageably introduced into the borehole. Following the introduction of the salt solution, resin injection may follow immediately. However, care must be taken to prevent premature contact of the resin composition with the salt catalyst in the wellbore. If such contact is made, the resin will polymerize and occlude the wellbore. In practice, a barrel or more of solvent is injected into the wellbore after the salt injection, flushing the wellbore of residual salt catalyst. Following this buffer zone the resin is introduced.

As the furfuryl alcohol oligomer comes into contact with the adsorbed acidic catalyst, the action of the heat in the formation and catalyst drives the auto-polymerization reaction forward. Thus, the alcohol oligomer polymerizes to a resin mass at the site of the catalyst adsorbed to the sand grains.

Resin which does not contact the acid catalyst does not polymerize. The adsorbed acid catalyst on the sand grains provides a site-specific polymerization catalyst only where needed, thus resulting in a site selective consolidated sand coating. A consolidation made in this manner is able to withstand oil circulation to at least 400° F.

As the polymerization reaction proceeds, water is produced as a by-product. If this water production is allowed to go unchecked, the polymerization reaction will soon equilibrate:

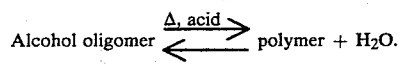

By providing an ester of a weak organic acid to the reaction site, the by-product water is consumed in a hydrolysis reaction of the ester to its corresponding alcohol and carboxylic acid. For example, the inclusion of an ester of a weak organic acid, widely available as inexpensive organic solvents, with the polymerizable resin composition serves both as the solvating agent for the polymerizable resin and as an ester to check water production. Accordingly, the polymerization reaction is driven to the desired degree of completion by the uptake of water in the ester hydrolysis reaction:

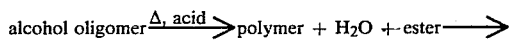

-continued alcohol + carboxylic acid.

The choice of the ester diluent will depend on a number of factors such as availability, cost, ease of hydrolysis, and nature of the acid formed. Care must be taken that the acid formed upon ester hydrolysis is insufficiently strong to independently catalyze the resin polymerization reaction, thereby losing the site specificity provided by the acid salt catalyst adsorption mechanism. Examples of esters which are easily hydrolyzed to weak acids under formation conditions, include but are not limited to ethyl acetate and propyl acetate.

The implementation and practice of the methods of the present invention ideally involve the consolidation of a monolayer of the sand surfaces, without consolidation of resin within the pore spaces. Resin consolidation development within the pore spaces causes a loss of permeability and correspondingly blocks production fluid flow.

In the practice of the methods of the present invention, there exists a dynamic equilibrium between adsorbtion and desorption of the acidic salt ion components with respect to the particular sand particles. The balance of equilibrium is of course affected by various factors including the concentration of ions injected, the available adsorbtion sites presented by the sands to the ions and the environmental temperature. A variation in any one of those factors will predictably shift the equilibrium to one direction or the other. If the equilibrium of reaction is shifted toward desorption, then a higher concentration of acidic salt catalyst is presented unbound in the pore spaces as opposed to bound on the sand surface. Upon subsequent contact with the polymerizable oligomer, the desorbed catalyst initiates resin consolidation in the pore spaces in addition to the consolidation effected at the sand surface sites. Since the polymerization reaction is concentration dependent, the concentration of desorbed catalyst effects the extent of polymerization and thickness of consolidation film or mass. The thickness of the consolidation is directly related to the magnitude of the concentration gradient of diffused catalyst. At some distance from the sand surface, where the catalyst population too low to effect polymerization, there is consolidation.

For example, it has been noted in the course of implementation of the present invention, that certain sands, Kern River Field sand in particular, poses certain desorbtion problems and corresponding permeability reduction. Kern River Field sand is noted as a sand possessing a high number of adsorption sites per given surface area. After injection of the acidic salt catalyst into the well formation, the catalyst adsorbs to the sand surface resulting in a high population density of adsorbed catalyst per given surface area. Upon subsequent contact with the polymerization resin, an exothermic polymerization reaction occurs. The additional heat generated by the reaction induces a portion of the adsorbed catalyst to desorb. The desorbed catalyst diffuses from the sand into the pore spaces, thereby establishing a concentration gradient of unbound catalyst.

Because certain sands, such as Kern River Field sand, adsorb more catalyst per given area than other sands, the population or concentration of catalyst which diffuses some distance from the sand surface into the pore spaces is correspondingly greater than the concentration gradient established for other sands after heating. Thus, this extent of subsequent consolidation occluding the pore space is greater for these sands. This in turn results in poor permeability.

The solution to the problem involves the cotemporaneous injection of a second adsorbent salt with the acidic salt catalyst. The second adsorbent salt is selected from those salts which possess adsorbtivity toward the sand but which will not catalyze the polymerization reaction. For example, in the preferred embodiment $MgCl_2$ is used as the second adsorbent salt. $MgCl_2$ which exhibits an effective pH of 7 in solution, will not initiate polymerization of the furfuryl oligomer. However, $Mg^{++}$ cation adsorbs to the sand just as $Zn^{++}$ does, slightly better in fact, because the charge density on magnesium is greater than on the larger zinc ion. The result is that some of the adsorption sites are satisfied with magnesium. Upon desorption, there exists a lower concentration gradient of zinc than otherwise would exist absent the magnesium adsorption. This lower concentration of zinc present in the pore is inadequate to effect consolidation of the pore spaces. Consequently good consolidation is effected substantially at the sand surface without involvement of the pore spaces, thereby preserving permeability.

It is therefore apparent from the foregoing description that in situ adsorption density and resultant desorbtion concentration of acidic catalyst may be modified and regulated by the addition of a second adsorbent salt.

Further, after the polymerization reaction has proceeded to the desired extent of completion, a base such as 1.0 N NaOH may be added to well injectants, neutralizing the acids and subsequently halting the catalysis of the oligomer polymerization and ester hydrolysis. The addition of the base is not essential nor preferred step of the sand consolidation embodiments of the invention, but may be desired as a matter of convenient clean-up. Moreover, to reverse the consolidation process, an oxidizing agent such as hypochlorite bleach can be added to the wellbore to effect unconsolidation.

Once the sands have been consolidated by the presence of the polymerized resin, oil production is resumed without observing reduction of permeability in the producing formation.

To further illustrate the invention, applicant has performed several laboratory experiments involving sand packs which have good permeability, not more than a 50% reduction of permeability, after sand consolidation according to the embodiments of the invention. The examples which follow, which should not be considered as limiting the invention but rather only as exemplary of the various embodiments are based on those laboratory results.

All experiments were conducted in 1-½" diameter ×6" long pipe nipples, packed with sand (flint shot 24–32 mesh) and closed with stainless steel end caps.

In each case the sand pack was initially evacuated and charged with water containing 3% sodium chloride, measuring approximately 90 ml pore volume.

EXAMPLE I

The 90 ml pore volume of salt water in the sand pack was first overdisplaced using 120 ml of 8% weight/volume (w/v) zinc chloride aqueous solution. After equilibration, the zinc chloride solution was displaced with 120 ml of 4:1 (w/v) mixture of Quacorr 1300 (a partially polymerized furfuryl alcohol supplied by Quaker Oats) and propyl acetate.

After injection of the alcohol resin, the sand pack was heated overnight in an over at 400° F. to cure the resin. Then one pore volume of 1.0 N NaOH was injected. Permeabilities were then measured according to standard techniques by timing the rate of flow of water through the sample pack, while maintaining a constant pressure in the sample pack.

Examination of the sand pack exhibited sand consolidation and good permeability.

EXAMPLE II

The methods of Example I were repeated using ethyl monochloracetate as the ester diluent. Evaluation of the core sand pack demonstrated consolidation but no permeability.

The ethyl monochloracetate hydrolyzed to ethanol and chloracetic acid. This acid is substantially stronger than acetic acid, sufficiently strong in itself to catalyze the polymerization reaction. Consequently, all the resin polymerized including the resin in the pore spaces as well as the resin adjacent to the sand surfaces. As a result of this complete and nonspecific consolidation, permeability was lost.

EXAMPLE III

The methods of Example I were repeated using ethyl acetate as the ester diluent. After injection of the resin, the sand pack was placed overnight in an oven set at 400° F. Then one pore volume (90 ml) of 1.0 N base (NaOH) was injected.

As further evaluation of the strength of consolidation, oil at 400° F. was continuously circulated through the pack for one week. This was accomplished by making the sand pack apparatus part of a closed loop. Oil flowed from a container into a pump and from there into the oven where it passed through a copper coil to allow the oil to reach 400° F. The oil then passed through the core and out of the oven back to the oil container.

No decrease in permeability was detected as a result of the consolidation. After one week the pipe nipple was removed from the oven and cooled. The caps were removed to disclose that the sand was still firmly consolidated.

EXAMPLE IV

The methods of Example I were repeated using instead an 8% solution of $FeCl_3$ as the acid catalyst. Under these conditions the $FeCl_3$ composition did not induce consolidation. Permeability however remained good.

EXAMPLE V

The methods of Example IV were repeated using an 8% $FeCl_3$ solution as the catalyst injectant followed with displacement at a 4:1 (w/v) mixture of Quacorr 1300 and ethyl acetate.

As in Example IV, no consolidation was evident and permeability remained good.

EXAMPLE VI

The operations of Example I were applied to a field test involving Kern River Field sand. The consolidation was excellent but there was very low permeability because the thickness of the consolidated film was too great, causing blockage of the pose spaces.

EXAMPLE VII

The methods of Example VI were repeated on the Kern River Field sand, except that two adsorbents were injected, magnesium chloride as well as zinc chloride. A $Mg^{++}/Zn^{++}$ molar ratio of two to one was used. The concentration of $ZnCl_2$ in aqueous solution was the same as used in Example I, 8% (weight/volume). The experiment resulted in good surface consolidation of the sand while returning permeability therethrough.

Although the invention has been described in terms of particular embodiments which applicant believes to represent the best modes of the invention at the time of this application, it will be recognized by those skilled in the art that various changes may be made in the composition and method embodiments of this specification without departing from the scope of the invention as defined in the following claims:

What is claimed is:

1. A method for selectively consolidating sand grains surround a borehole in a relatively high-temperature subterranean formation, comprising:
   providing an aqueous fluid composition of an acidic salt catalyst selected from the group consisting of $ZnCl_2$, $AlCl_3$, $CrCl_3$ and $ZrCl_4$, the catalyst effective to cure a polymerizable furfuryl alcohol oligomer resin and effective to adsorb to the surface of sand grains;
   passing the catalyst composition through said borehole and into the formation surrounding the borehole;
   allowing the acidic salt catalyst to be adsorbed onto the surface of the sand grains, said acidic salt catalyst forming a dispersed acid salt catalyst layer on the surface of the sand grains;
   providing a resin composition comprising polymerizable furfuryl alcohol oligomer resin;
   following the passage of the catalyst composition into the formation, passing the resin composition through said borehole and into the formation surrounding the borehole; and
   polymerizing the resin at the site of the adsorbed acidic salt catalyst to form as a reaction product a polymer effective to consolidate the sand grains without substantially reducing the permeability through the consolidated formation.

2. A method for selectively consolidating sand grains surrounding a borehole in a relatively high-temperature subterranean formation, comprising:
   providing a fluid composition of an acidic salt catalyst, the catalyst effective to cure a selected polymerizable resin and effective to adsorb to the surface of the sand grains;
   passing the catalyst composition through said borehole and into the formation surrounding the borehole;
   allowing the acidic salt catalyst to be adsorbed onto the surface of the sand grains, said acidic salt catalyst forming a dispersed acid salt catalyst layer on the surface of the sand grains;
   providing a mixture comprising the selected polymerizable resin and an ester of weak organic acid, the organic acid being insufficiently strong to catalyze polymerization of the polymerizable resin;
   passing the resin composition through said borehole and into the formation surrounding the borehole;
   polymerizing the resin at the site of the adsorbed acid salt catalyst to form as a reaction product a polymer effective to consolidate the sand grains without substantially reducing the permeability therethrough; and hydrolyzing the ester with the water produced as a by-product of the polymerization reaction, the hydrolysis reaction serving to control the extent of resin polymerization reaction by limiting the amount of water available for the back depolymerization reaction.

3. The method according to claim 2 wherein the acidic salt catalyst is $ZnCl_2$.

4. The method according to claim 2 wherein the polymerization resin is furfuryl alcohol oligomer.

5. The method according to claim 2 wherein the ester is a lower alkyl acetate, the alkyl radical comprising of 2 to 8 carbon atoms.

6. The method according to claim 2 wherein the ester is ethyl acetate or propyl acetate.

7. The method according to claim 2 wherein the mixture of polymerizable resin and ester comprise a ratio of about 4:1 (weight/volume) of resin to ester.

8. A method for selectively consolidating sand grains surrounding a borehole relatively high-temperature subterranean formation, comprising:

providing a fluid composition of first adsorbent salt, the first salt being an acid catalyst;

passing the catalyst composition into said borehole at a pressure sufficient to overcome the natural formation pressure;

providing a fluid composition of a second adsorbent salt, the second salt not being an acid catalyst;

passing the second salt composition into said borehole at a pressure sufficient to overcome the natural formation pressure;

allowing the first and second salts to be adsorbed onto the surface of the sand grains, said first and second salts forming a dispersed salt layer on the surface of the sand grains;

providing a resin composition comprising a polymerizable resin;

passing the resin composition into said borehole at a pressure sufficient to overcome the natural formation pressure; and polymerizing the resin at the site of the absorbed acid salt catalyst to form as a reaction product a polymer effective to consolidate the sand grains without substantially reducing the permeability through the consolidated formation.

9. The method according to claim 8 wherein the acidic salt catalyst is $ZnCl_2$, $AlCl_3$, $CrCl_3$, or $ZrCl_4$.

10. The method according to claim 8 wherein the second adsorbent salt is $MgCl_2$.

11. The method according to claim 8 wherein both the first and second adsorbent salts are provided in the same fluid composition.

12. The method according to claim 8 wherein the cation molar ratio of the first salt to the second salt is about one to two.

13. The method according to claim 8 further comprising:

providing an ester composition comprising an ester of a weak organic acid, the organic acid being insufficiently strong to catalyze the polymerizable of the resin composition;

passing the ester composition into said borehole at a pressure sufficient to overcome the natural formation pressure; and hydrolyzing the ester with the water produced as a by-product of the polymerization reaction, the hydrolysis reaction serving to control the extent of resin polymerization reaction by limiting the amount of water available for the back depolymerization reaction.

14. The method according to claim 13 wherein the ester is a lower alkyl acetate, the alkyl radical comprising 2 to 8 carbon atoms.

15. The method according to claim 13 wherein the ester is ethyl acetate or propyl acetate.

* * * * *

UNITED STATES PATENT AND TRADEMARK OFFICE
CERTIFICATE OF CORRECTION

PATENT NO. : 4,427,069
DATED : January 24, 1984
INVENTOR(S) : Robert H. Friedman It is certified that error appears in the above—identified patent and that said Letters Patent is hereby corrected as shown below:

Column 8, line 21, cancel "surround" and insert --surrounding--.

Signed and Sealed this

Twenty-ninth Day of May 1984

[SEAL]

Attest:

GERALD J. MOSSINGHOFF

Attesting Officer

Commissioner of Patents and Trademarks